(12) United States Patent
Tsai et al.

(10) Patent No.: US 11,169,254 B2
(45) Date of Patent: Nov. 9, 2021

(54) OPERATION MODE CONTROL METHOD AND RADAR SYSTEM

(71) Applicant: National Chung-Shan Institute of Science and Technology, Taoyuan (TW)

(72) Inventors: Shih-Che Tsai, Tao-yuan (TW); Min-Ching Lin, Tao-yuan (TW); Kuang-Fu Chung, Hsinchu (TW); Chun-Cheng Chen, Tao-yuan (TW); Ruei-Shen Wang, Hsinchu (TW); Po-Ju Chiang, Tao-yuan (TW); Ming-Jhe Wu, Taipei (TW); Hung-Fu Chang, Tao-yuan (TW); Wen-Chin Liao, Taipei (TW)

(73) Assignee: NATIONAL CHUNG-SHAN INSTITUTE OF SCIENCE AND TECHNOLOGY, Taoyuan (TW)

( * ) Notice: Subject to any disclaimer, the term of this patent is extended or adjusted under 35 U.S.C. 154(b) by 286 days.

(21) Appl. No.: 16/152,418

(22) Filed: Oct. 5, 2018

(65) Prior Publication Data

US 2019/0107616 A1 Apr. 11, 2019

Related U.S. Application Data

(60) Provisional application No. 62/568,799, filed on Oct. 6, 2017.

(51) Int. Cl.
*G01S 13/58* (2006.01)
*G01S 13/72* (2006.01)
*G01S 7/04* (2006.01)
*G01S 13/02* (2006.01)

(52) U.S. Cl.
CPC .............. *G01S 13/723* (2013.01); *G01S 7/04* (2013.01); *G01S 13/58* (2013.01); *G01S 2013/0245* (2013.01)

(58) Field of Classification Search
CPC ................... G01S 13/58; G01S 13/723; G01S 2013/0245; G01S 7/04
See application file for complete search history.

(56) References Cited

U.S. PATENT DOCUMENTS

| 4,789,861 A | * | 12/1988 | Baggett | G01S 13/4445 |
| | | | | 342/152 |
| 5,262,785 A | * | 11/1993 | Silverstein | G01S 13/522 |
| | | | | 342/162 |
| 5,311,187 A | * | 5/1994 | Garside | G01S 13/872 |
| | | | | 342/59 |

(Continued)

*Primary Examiner* — Timothy A Brainard

(57) ABSTRACT

An operation mode control method implemented by a radar system, the operation mode control method includes steps of: (S1) receiving a single target tracking (STT) triggering data comprising a representation of triggering of a STT tracking mode and a selected tracking target to be tracked by the radar system; (S2) controlling a radar sensor to emit detection wave beam; (S3) controlling, the radar sensor to receive echo waves; (S4) analyzing, echo signal to generate STT target data; (S5) executing a STT program to obtain a tracking data of a selected tracking target; (S6) outputting the tracking data to a memory device for storage or to a human-machine interface (HMI) device for presenting to the user of the radar system.

30 Claims, 14 Drawing Sheets

(56) References Cited

U.S. PATENT DOCUMENTS

| | | | | |
|---|---|---|---|---|
| 9,000,972 | B1* | 4/2015 | Cahoon | G01S 13/723 342/26 B |
| 2005/0156777 | A1* | 7/2005 | King | G08G 5/0021 342/29 |
| 2007/0216566 | A1* | 9/2007 | Wood | G01S 13/726 342/41 |
| 2008/0100503 | A1* | 5/2008 | Yanagi | G01S 13/937 342/176 |
| 2012/0092211 | A1* | 4/2012 | Hampel | G01S 13/762 342/175 |
| 2012/0139786 | A1* | 6/2012 | Puzella | H01Q 1/3216 342/368 |
| 2013/0222177 | A1* | 8/2013 | Kajiki | G01S 13/52 342/109 |
| 2015/0256255 | A1* | 9/2015 | Stewart | H04B 10/1123 398/129 |
| 2015/0276917 | A1* | 10/2015 | Dawber | G01S 5/06 342/25 A |
| 2016/0061946 | A1* | 3/2016 | Wallace | G01S 13/5244 342/161 |
| 2016/0195614 | A1* | 7/2016 | Tabrikian | G01S 13/931 342/74 |
| 2016/0245911 | A1* | 8/2016 | Wang | G01S 7/292 |
| 2016/0353080 | A1* | 12/2016 | Nguyen | G06T 7/174 |
| 2016/0377711 | A1* | 12/2016 | Arage | G01S 13/524 342/118 |
| 2017/0334355 | A1* | 11/2017 | Hubbell | G01S 13/931 |
| 2017/0363711 | A1* | 12/2017 | Rao | G01S 13/34 |
| 2018/0172813 | A1* | 6/2018 | Rao | G01S 13/931 |

* cited by examiner

OPERATION MODE CONTROL METHOD AND RADAR SYSTEM

CROSS-REFERENCE TO RELATED APPLICATION

The application claims the benefit of U.S. provisional patent application No. 62/568,799, filed on 6 Oct. 2017, the entirety of which is incorporated herein by reference.

FIELD

The present disclosure relates to radar system, and more particularly to a method for controlling the operation mode of the radar system.

BACKGROUND

Surveillance radar system for small target is used for tracking and displaying various small moving targets, such as human, wheel vehicle or drone. In this case, radar system is usually designed to be easily to move or can to be applied on different surveillance conditions.

Azimuth scanning of surveillance radar system for small target are usually achieved by a servo rotating system of an antenna base with a rotary joint. In this case, it is hard to switch the radar system from a tracking while scanning (TWS) tracking mode to a single target tracking (STT) tracking mode.

Therefore, there is a need for a radar system with phased array antenna achieved beam steering function and associated tracking operation mode control method that allow the radar system to switch between the TWS tracking mode and the STT tracking mode.

BRIEF SUMMARY OF THE DISCLOSURE

An objective of the present invention is to provide an operation mode control method implemented by a radar system to allow a user of the radar system to set tracking and detection mode to meet various need in different situations.

An embodiment of the present disclosure provides an operation mode control method implemented by a radar system, the operation mode control method comprises steps of: (S1) receiving, by a computing system of the radar system, a single target tracking (STT) triggering data comprising: a representation of triggering of a STT tracking mode; and a selected tracking target to be tracked by the radar system, wherein the selected tracking target is selected by a user of the radar system: (S2) controlling, by the computing system, a radar sensor system electrically connected to the computer system to emit at least one first detection wave beam toward a first direction generated according to the selected tracking target; (S3) controlling, by the computing system, the radar sensor system to receive at least one first echo waves corresponding to the at least one first detection wave beam; (S4) analyzing, by a digital signal processor (DSP) of the radar sensor system, the computing system, or both of the DSP and the computing system, a first echo signal to generate a first STT target data, wherein the first STT target data comprises a list of first detected objects detected by the at least one first detection wave beam and comprises data of direction and distance of each of the first detected objects in the STT target: data; (S5) executing, by the computing system, a STT program to track the selected tracking target to obtain a tracking data of the selected tracking target, wherein the tracking data comprises range, direction, and velocity of the selected tracking target; and (S6) outputting, by the computing system, the tracking data of the selected tracking target to a memory device for storage or to a human-machine interface (HMI) device electrically connected to the computing system and the DSP for presenting to the user of the radar system.

In a preferred embodiment, the operation mode control method further comprises a step of: displaying, by the HMI device, a STT triggering function to allow the user to trigger the HMI device to generate the representation of triggering of the STT tracking mode.

In a preferred embodiment, the operation mode control method further comprises a step of: displaying, by the HMI device, a target selecting option to allow the user to select the tracking target under the STT tracking mode.

In a preferred embodiment, the target selecting option is displayed in a form of text list.

In a preferred embodiment, the target selecting option is displayed in a form of icons on a plan position indicator (PPI).

In a preferred embodiment, the operation mode control method further comprises a step of: displaying, by the HMI device, a STT control item, wherein the STT control item allows the user to set a threshold number of STT failure, wherein the STT failure is used as a criterion for stopping the single target tracking of the selected tracking target.

In a preferred embodiment, the selected tracking target is selected from a target list generated by a Tracking While Scan (TWS) program, and is selected by the computing system.

In a preferred embodiment, the at least one first detection wave beam comprises three sequential lobes, a middle lobe of the sequential lobes is transmitted in the first detection direction, and the other two lobes of the sequential lobes are on directions deviating from each side of the first detection direction on a same azimuth plane for a first angle and a second angle, respectively.

In a preferred embodiment, the STT program comprises steps of (S51) receiving, by the computing system, the first STT target data; (S52) correlating, by the computing system, the received first STT target data with a previous target data; (S53) updating and outputting, by the computing system, a target list; (S54) predicting a moving track of the selected tracking target, and outputting, by the computing system, a predicted moving track of the selected tracking target; (S55) controlling, by the computing system, the radar sensor system to emit at least one second detection wave beam toward a second direction generated according to the predicted moving track of the selected tracking target; (S56) controlling, by the computing system, the radar sensor system 2000 to receive at least one second echo waves corresponding to the at least one second detection beam; and (S57) analyzing, by the DSP, the computing system, or both of the DSP and the computing system, a second echo signal corresponding to the at least one second detection wave beam and received by the radar sensor system to generate a second STT target data, wherein the second STT target data comprises a list of second detected objects detected by the at least one second detection wave beam and comprises data of direction and distance of each of the second detected objects in the second STT target data.

In a preferred embodiment, the moving track of the selected tracking target is predicted according to an alpha-beta filter algorithm.

In a preferred embodiment, the operation mode control method further comprises a step of: displaying, by the HMI device, a STT control item, wherein the STT control item provides options for the user to set parameters of the alpha-beta filter algorithm.

In a preferred embodiment, the operation mode control method further comprises a step of: displaying, by the HMI device, a signal processing control item, wherein die signal processing control item provides options for the user to select a Doppler Fast Fourier Transform (FFT) algorithm and a FFT merge algorithm for analyzing echo signal of the radar system.

In a preferred embodiment, the operation mode control method further comprises a step of: displaying, by the HMI device, a signal processing control item, wherein the signal processing control item provides options for the user to select a non-coherent integration (NCI) algorithm for analyzing echo signal of the radar system.

In a preferred embodiment, the at least one first detection wave beam is emitted by a transmitting phased array antenna module of the radar sensor system, and the first echo waves is received by a receiving phased array antenna module of the radar sensor system.

In a preferred embodiment, the radar system is operated under a TWS tracking mode prior to receiving the STT triggering data.

In a preferred embodiment, the radar system is alternatingly switched between a TWS program and the STT tracking mode when a time criterion is met.

Another embodiment of the present disclosure provides a radar system comprises a human machine interface (HMI) device, and a computing system electrically connected to the HMI device, wherein the computing system comprises a memory device and is configured to execute steps of: (S1) receiving, by the computing system of the radar system, a single target tracking (STT) triggering data comprising: a representation of triggering of a STT tracking mode; and a selected tracking target to be tracked by the radar system, wherein the selected tracking target is selected by a user of the radar system; (S2) controlling, by the computing system, a radar sensor system electrically connected to the computer system to emit at least one first detection wave beam toward a first direction generated according to the selected tracking target; (S3) controlling, by the computing system, the radar sensor to receive at least one first echo waves corresponding to the at least one first detection wave beam; (S4) analyzing, by a digital signal processor (DSP) of the radar sensor system, the computing system, or both of the DSP and the computing system, first echo waves to generate a first STT target data, wherein the first STT target data comprises a list of first detected objects detected by the at least one first detection wave beam and comprises data of direction and distance of each of the first detected objects in the STT target data; (S5) executing, by the computing system, a STT program to track the selected tracking target to obtain a tracking data of the selected tracking target, wherein the tracking data comprises range, direction, and velocity of the selected tracking target; and (S6) outputting, by the computing system, the tracking data of the selected tracking target to a memory device for storage or to a human-machine interface (HMI) device electrically connected to the computing system and the DSP for presenting to the user of the radar system.

In a preferred embodiment, the HMI device is further configured to display a STT triggering function to allow the user to trigger the HMI device to generate the representation of triggering of a STT tracking mode.

In a preferred embodiment, the HMI device is further configured to display a target selecting option on the HMI device to let the user to select a target to be tracked by the SIT tracking mode.

In a preferred embodiment, the target selecting option is displayed in a form of text list.

In a preferred embodiment, the target selecting option is displayed in a form of icons on a plan position indicator (PPI).

In a preferred embodiment, the HMI device is configured to display a STT control item on the HMI device, wherein the STT control item allows the user to set a threshold number of STT failure, wherein the STT failure is used as a criterion for stopping the single target tracking of the selected tracking target.

In a preferred embodiment, the computing system is further configured to select the selected tracking target from a target list generated from a target list generated by a Tracking While Scan (TWS) program, and is selected by the computing system.

In a preferred embodiment, the at least one first detection wave beam comprises three sequential lobes, a middle lobe of the sequential lobes is transmitted in the first detection direction, and the other two lobes of the sequential lobes are on directions deviating from each side of the first detection direction on a same azimuth plane for a first angle and a second angle, respectively.

In a preferred embodiment, the STT program comprises steps of: (S51) receiving, by the computing system, the first STT target data; (S52) correlating, the computing system, the received first STT target data with a previous target data; (S53) updating and outputting, by the computing system, a target list; (S54) predicting a moving track of the selected tracking target, and outputting, by the computing system, the predicted moving track of the selected tracking target; (S55) controlling, by the computing system, the radar sensor system to emit at least one second detection wave beam toward a second direction generated according to the predicted moving track of the selected tracking target; (S56) controlling, by the computing system, the radar sensor system 2000 to receive at least one second echo waves corresponding to the at least one second detection beam; and (S57) analyzing, by the DSP, the computing system, or both of the DSP and the computing system, second echo waves corresponding to the at least one second detection wave beam and received by the radar sensor system to generate a second STT target data, wherein the second STT target data comprises a list of second detected objects detected by the at least one second detection wave beam and comprises data of direction and distance of each of the second detected objects in the second STT target data.

In a preferred embodiment, the moving track of the selected tracking target is predicted according to an alpha-beta filter-algorithm.

In a preferred embodiment, the HMI device is further configured to display a STT control item allowing the user to manipulate the step of (S4), wherein the STT control item provides options for the user to set parameters of the alpha-beta filter algorithm.

In a preferred embodiment, the radar system according to the claim 17, wherein the HMI device is further configured to display a signal processing control item, wherein, the signal processing control item provides options for the user to select a Doppler Fast Fourier Transform (FFT) algorithm and a FFT merge algorithm for analyzing echo signal of the radar system.

In a preferred embodiment, the signal processing control item provides options for the user to select a non-coherent integration (NCI) algorithm for analyzing echo signal of the radar system.

In a preferred embodiment, the radar system further comprises a transmitting phased array antenna module configured to emit the at least one first detection wave beam and a receiving phased array antenna to receive the at least one echo wave.

In a preferred embodiment, the radar system being further configured to be operated under a TWS tracking mode prior to receiving the STT triggering data.

In a preferred embodiment, the radar system being alternatingly switched between a TWS program and the STT tracking mode when a time criterion is met.

In a preferred embodiment, the DSP and the computer system are communicated through a wireless type communication machine-machine interface.

In a preferred embodiment, the DSP and the computer system are integrated by a system on chip (SoC) device, the SoC device is integrated with the radar sensor system, and the radar sensor system is electrically connected to the HMI device.

BRIEF DESCRIPTION OF THE DRAWINGS

Implementations of the present technology will now be described, by way of example only, with reference to the attached figures.

DETAILED DESCRIPTION

Figure 1:
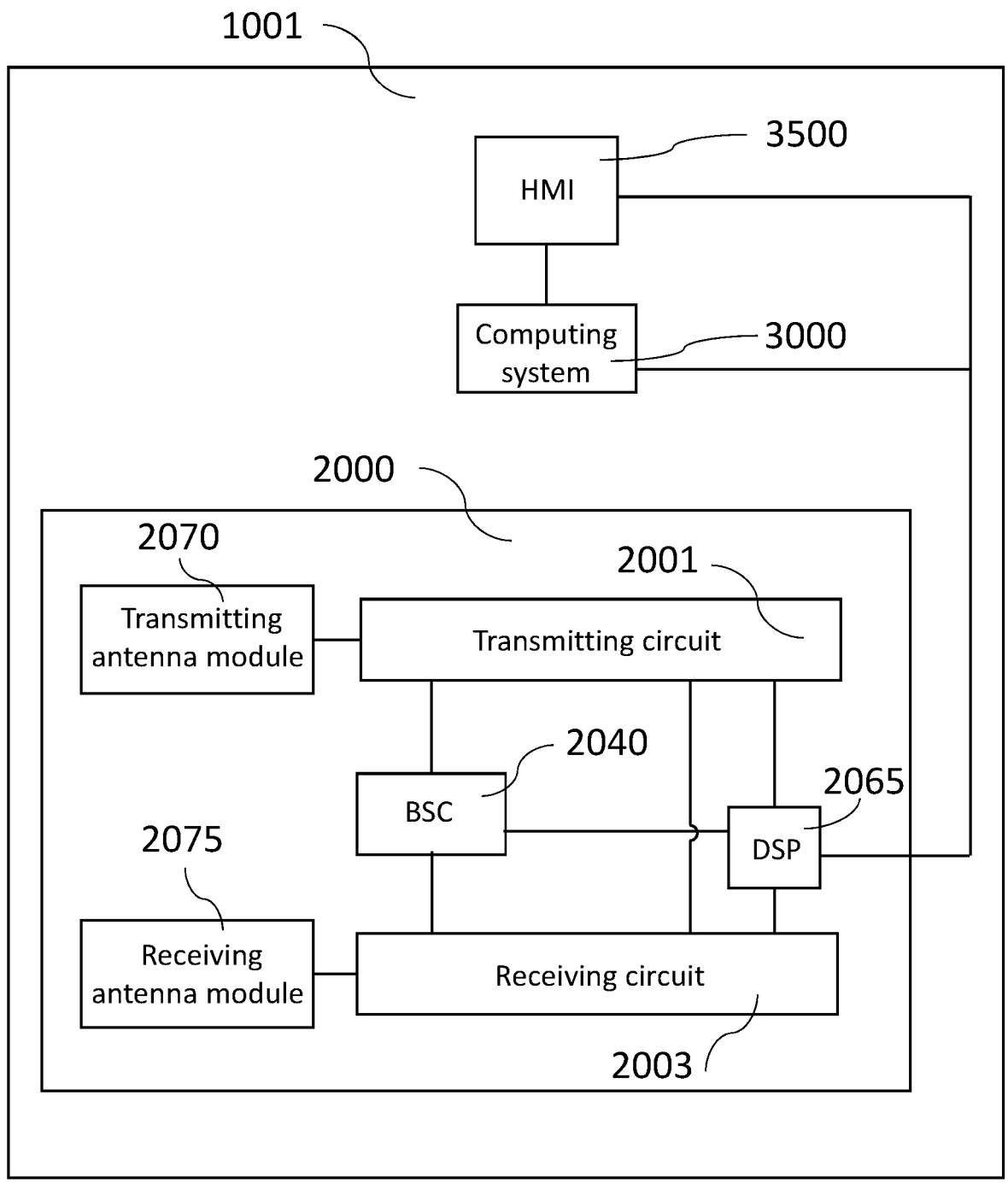
FIG. 1 is a block diagram of the hardware architecture of a radar system in accordance with an embodiment of the present disclosure.

The present disclosure will now be described more fully hereinafter with reference to the accompanying drawings illustrating various exemplary embodiments of the disclosure. The present disclosure may, however, be embodied in many different forms and should not be construed as limited to the embodiments set forth herein. Rather, these embodiments are provided so that this disclosure will be thorough and complete, and will fully convey the scope of the disclosure to those skilled in the art. Like reference numerals refer to like elements throughout.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

It will be understood that the terms "and/or" and "at least one" include any and all combinations of one or more of the associated listed items. It will also be understood that, although the terms first, second, third etc. may be used herein to describe various elements, components, regions, parts and/or sections, these elements, components, regions, parts and/or sections should not be limited by these terms. These terms are only used to distinguish one element, component, region, part or section from another element, component, region, layer or section. Thus, a first element, component region, part or section discussed below could be termed a second element, component, region, layer or section without departing from the teachings of the present disclosure.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

According to an embodiment of the present disclosure, a radar system 1000 for target detection and/or target tracking includes a plurality of radar system hardware 1001. The radar system 3000 executes a plurality of computer executable radar system instruction 1003 to detect and/or track a target.

Referring now to FIG. 1. According to an embodiment of the present disclosure, the plurality of radar system hardware 1001 includes a radar sensor system 2000, a computing system 3000 and a least one human machine interface (HMI) device 3500. Additionally, the plurality of radar system hardware 1001 may further include a plurality of mechanical structure 4000 (not shown in FIG. 1), and a power source 5000 (not shown in FIG. 1). In some embodiment, the electrical power of the radar system 1000 is provided by an external power source 5001 (not shown in FIG. 1) which is not included in the radar system 1000.

The radar sensor system 2000 is configured to generate and emit radio frequency (RF) electromagnetic (EM) waves toward the environment, to collect radio waves scattered by one or more physical objects, to extract range and/or velocity information of the one or more physical objects, and to output the range and/or velocity information of the one or more physical objects to the computing system 3000 and/or the HMI device 3500.

Referring again to FIG. 1. According to an embodiment of the present disclosure, the radar sensor system 2000 includes a transmitting circuit 2001, a transmitting antenna module 2070, a receiving antenna module 2075, a receiving circuit 2003, a beam steering control (BSC) circuit 2040, and a digital signal processor (DSP) 2065.

The transmitting circuit 2001 generates and outputs RF signals to the transmitting antenna module 2070. The transmitting antenna module 2070 transforms the outputted RF signals into EM waves and emits these RF EM waves a to the environment. Some of these emitted RF EM waves are scattered by physical objects in the environment and received by the receiving antenna module 2075. The receiving antenna module then transforms these received RF EM waves (echo waves) into RF electric signals (echo signals).

The receiving circuit 1003 receives the echo signals from the receiving antenna module 2075. The echo signals are processed by the receiving circuit 2003, are sampled by an analog to digital converter, and are outputted to the DSP 2065 by the receiving circuit 2003 for further signal processing steps.

Referring again to FIG. 2. According to an embodiment of the present disclosure, the transmitting circuit 2001 includes a waveform generator 2055, a least one power divider 2045, at least one transmitting core chip 2030, and a plurality of power amplifier (PA) 2020. The receiving circuit 2003 include a plurality of low noise amplifier (LNA) 2025, at least one receiving core chip 2035, at least one power combiner 2050, and a down converter 2060.

Figure 2:
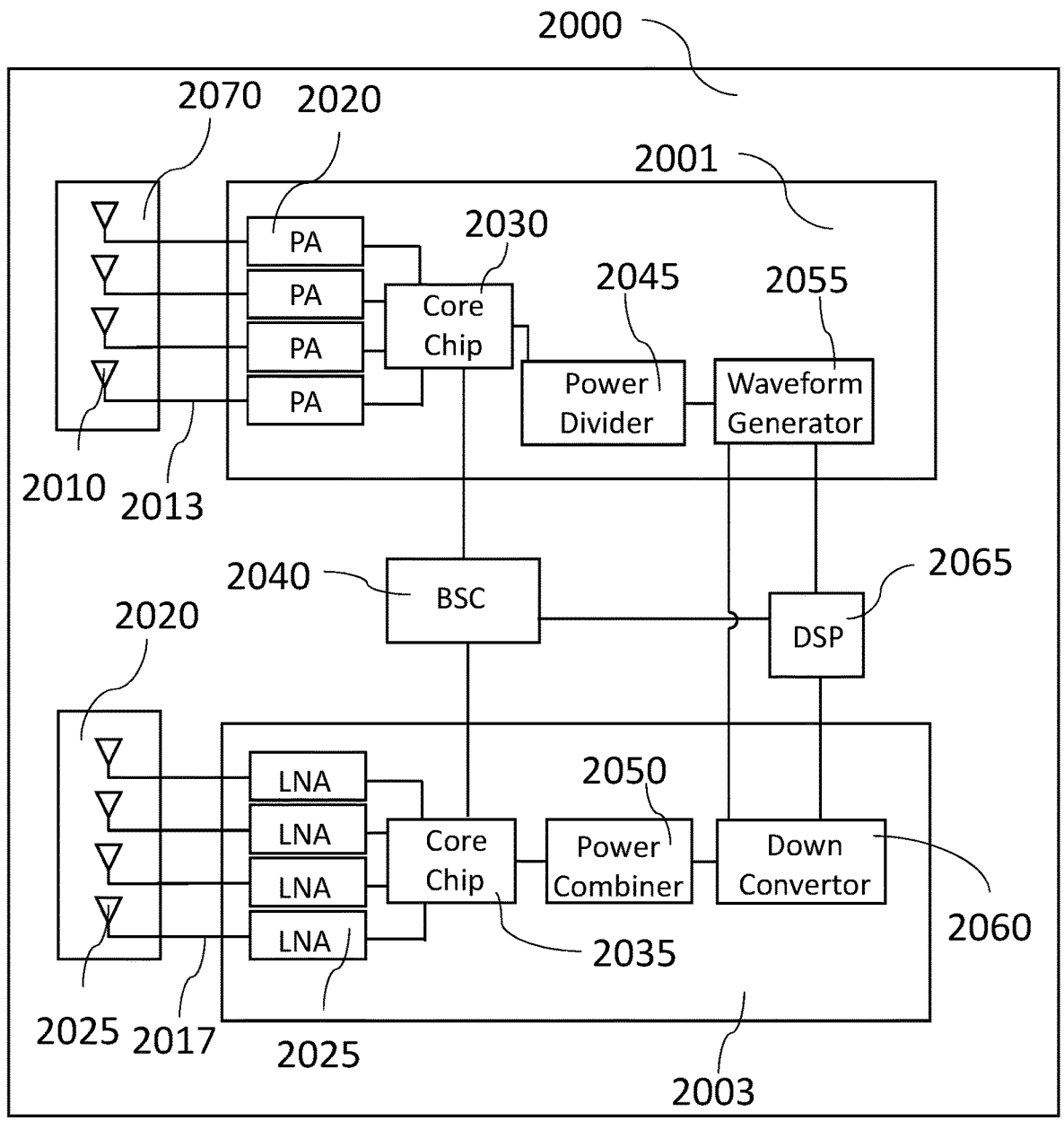
FIG. 2 is a block diagram of the hardware architecture of a radar system in accordance with an embodiment of the present disclosure.

In FIG. 2, waveform generator 2055 generates transmitting signal according to predetermined waveform signal inputted from the DSP 2065. The transmitting signal are then sent to the power divider 2045. The power divider 2045 divides the transmitting signal into a plurality of divided transmitting signal. These divided transmitting signals are then sent to several transmitting channels (for example: four or eight transmitting channels). Through these transmitting channels, the plurality of divided transmitting signals is then input into at least one transmitting core chip 2030. For example, there may have eight transmitting core chips 2030 corresponded to eight transmitting channels from the power divider 2045.

The transmitting core chip 2030 is configured to further divide the divided transmitting signal into a plurality of further divided transmitting signal, to modulate the phase of each of the plurality of further divided transmitting signal, and/or to output each of the phase modulated further divide transmitting signal to a plurality of corresponded power amplifier (PA) 2020 to amplify the power of the transmitting signal. Then, by the plurality of transmitting antenna 2010, each of the amplified further divide transmitting signal is transformed into RF EM waves and emitted to the environment.

In some embodiments, the transmitting core chip 2030 may further modulate the gain of the further divided transmitting signal in order to generate specific shape of the emitted wave beam. For example, in order to reduce the side lobe of the emitted wave beam, a specific modulation of gain in the transmitting core chip 2030 may be executed.

Figure 3:
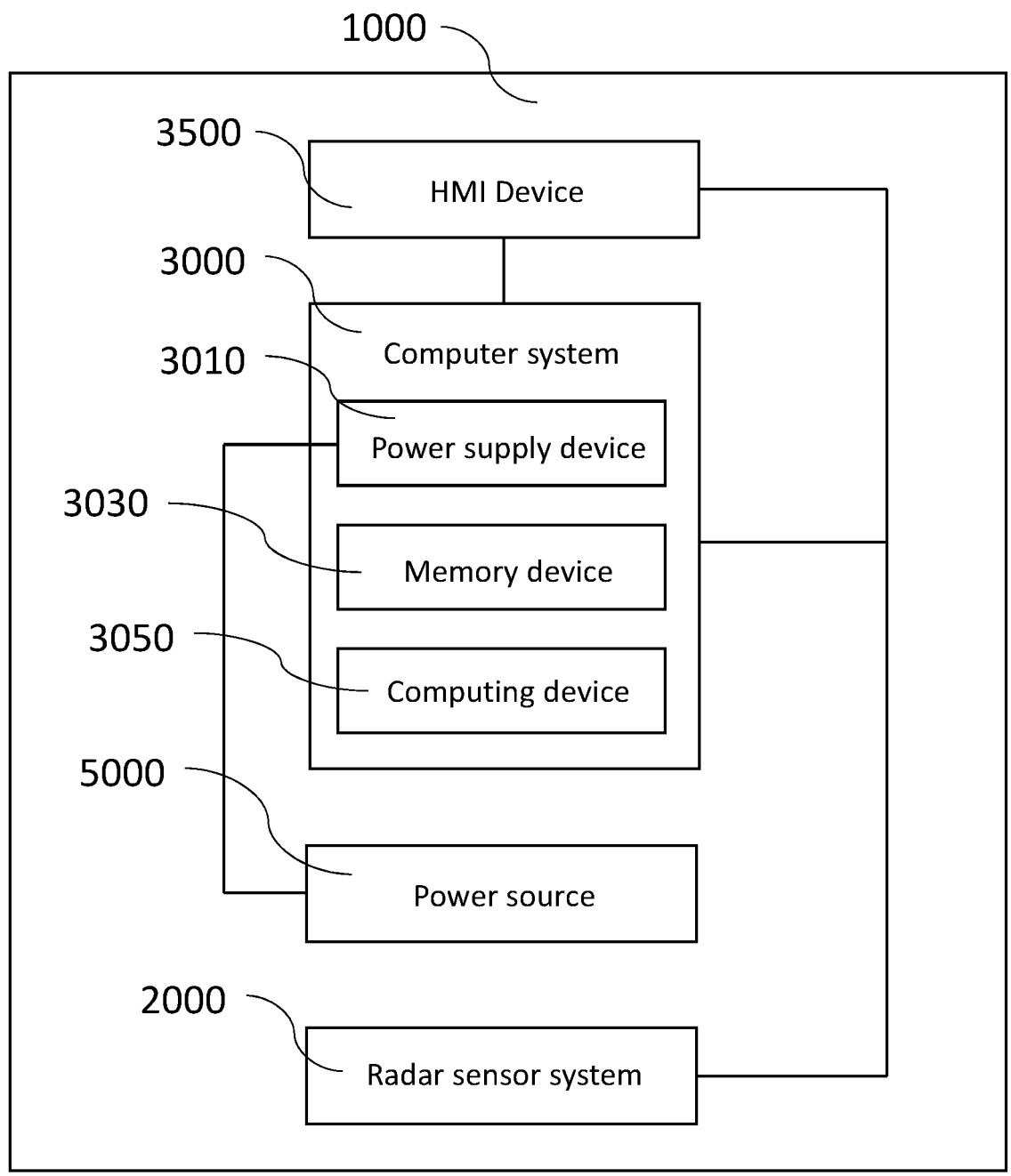
FIG. 3 is a block diagram of the hardware architecture of a radar system in accordance with of an embodiment the present disclosure.

The transmitting antenna module 2070 is configured to receive the RF signal from the transmitting circuit 2001 and emit corresponded RF EM waves to the environment. The transmitting antenna module 2070 includes a plurality of transmitting antenna element 2010. These transmitting antenna elements may be arranged as at least one transmitting antenna array 2011. Each of the transmitting antenna element 2010 is ted with transmitting signals through a transmitting line 2013 connected to the transmitting circuit 2001. In FIG. 3 each of the transmitting line 2013 is connected to a power amplifier (PA) 2020. For some embodiment, multiple transmitting lines may connect to one power amplifier (PA) 2020.

The emitted RF EM waves may encounter physical object in the environment and then scattered by the physical object. The scattered RF EM waves (echo waves) are then received by the receiving antenna module 2075.

The receiving antenna module 2075 is configured to receive the echo waves scattered by the physical object in the environment. The receiving antenna module 2075 includes a plurality of receiving antenna element 2015. These receiving antenna 2015 elements may be arranged as at feast one receiving antenna array 2016. The receiving antenna module 2075 transforms and outputs the echo waves into RF electric signal (echo signal). The echo signal outputted by the receiving antenna element 2015 is then amplified by a low noise amplifier (LNA) 2025 of the receiving circuit 2003. In FIG. 3, each of the receiving line 2017 is connected to a low noise amplifier (LNA) 2025. For some embodiment, multiple receiving lines 2017 may connect to one low noise amplifier (LNA) 2025.

At the plurality of low noise amplifier (LNA) 2025, the echo signal is amplified and sent to a plurality of receiving core chip 2035. The receiving core chip 2035 is configured to gather echo signals inputted from the plurality of low noise amplifier (LNA) 2025, to modulate the phase of each of echo signal and to output the gathered signal to a power combiner 2050. The power combiner 2050 combines each echo signal inputted from at least one receiving core chip 2035 and outputs the combined echo signal to a down converter 2060. At the down converter 2060, the frequency of the echo signal is mixed with the frequency of the transmitting signal by a mixer (not shown in FIG. 2) to generate mixed echo signal with an intermediate frequency. The mixed echo signal is then sampled to generate digital echo signal by an analog-to-digital converter (ADC) (not shown in FIG. 2) and sent to the DSP 2065.

The DSP 2065 is configured to execute a plurality of digital signal processing steps to extract range and/or velocity information of the echo signal. The DSP 2065 is electrically connected to a computing system 3000 (not shown in FIG. 2) or a HMI device 3500 (not shown in FIG. 3), or both of the computing system 3000 and the HMI device 3500.

The BSC circuit 2040 is configured to manipulate the phase of the further divided transmitting signal divided by the transmitting core chip and to manipulate the phase of tire signals inputted form the plurality of LNA 2025 to the receiving core chip 2035, in order to change the direction of the main lobe of the RF EM wave emitted by the transmitting antenna module and receive the echo waves correspondingly.

In some embodiments, the BSC circuit 2040 includes a BSC memory circuit and a BSC computing circuit. The BSC memory circuit is configured to save a BSC look up table. The BSC look up table includes a plurality of relationship between a target direction and command of phase control. By using the BSC look up table, the BSC computing circuit may generate, according to a target direction command received from the DSP 2065, a command of phase control to control the transmitting core chip 2065 to modulate the phase of the further divided transmitting signal. The BSC computing circuit may also output the command of phase control to control the receiving core chip 2035 to modulate the phase of the received echo signal.

Referring now to FIG. 3. According to an embodiment of the present disclosure, the computing system 3000 includes at least one power supply device 3010, at least one memory device 3030, at least one computing device 3050 and others. The power supply device 3010 is electrically connected to a power source 5000. The power supply device 3010 is configured to manage the electrical power provided by the power source 5000 and to distribute the electrical power to other device of the radar system 1000. The memory device 3030 is configured to store computer executable instructions such as the radar system instruction 1003, and to store the range and/or velocity information inputted from the DSP 2065. The computing device 3050 is configured to execute instructions to detect and or track target in the environment, and to control the radar system 1000. The computing device 3050 may be a general purpose processor, an application-specific instruction set processor or an application-specific integrated circuits that performs operations on a data source, such as the storage unit or other data stream. For example, the processor is an ARM based processor or an 8086× processor. In some embodiments, the processor 1710 further includes a plurality of digital or analog input/output, and may be a real-time operating system (RTOS) processor.

Additionally, in order to exchange signals between the radar sensor system 2000 and the computing system 3000, the radar system may include a variety of machine to machine interface 3700 (not shown in FIG. 3) and corresponded communication protocol. For example, the machine to machine interface 3700 may lie for a wired type communication channel, for a wireless type communication channel, for a digital type communication channel, for an analog type communication channel, for a RF EM wave medium type communication channel, or for an optical medium type communication channel.

The HMI device 3500 is configured to provide an information exchanging means between the radar system 1000 and a user 0001 (not shown in FIG. 3) of the radar system 1000. The HMI device 3500 may be an input device 3505 (such as a keyboard, a mouse, a back ball, a microphone or a touch pad) or an output device 3555 (such as a display device 3560, or an audio device).

Figure 4:
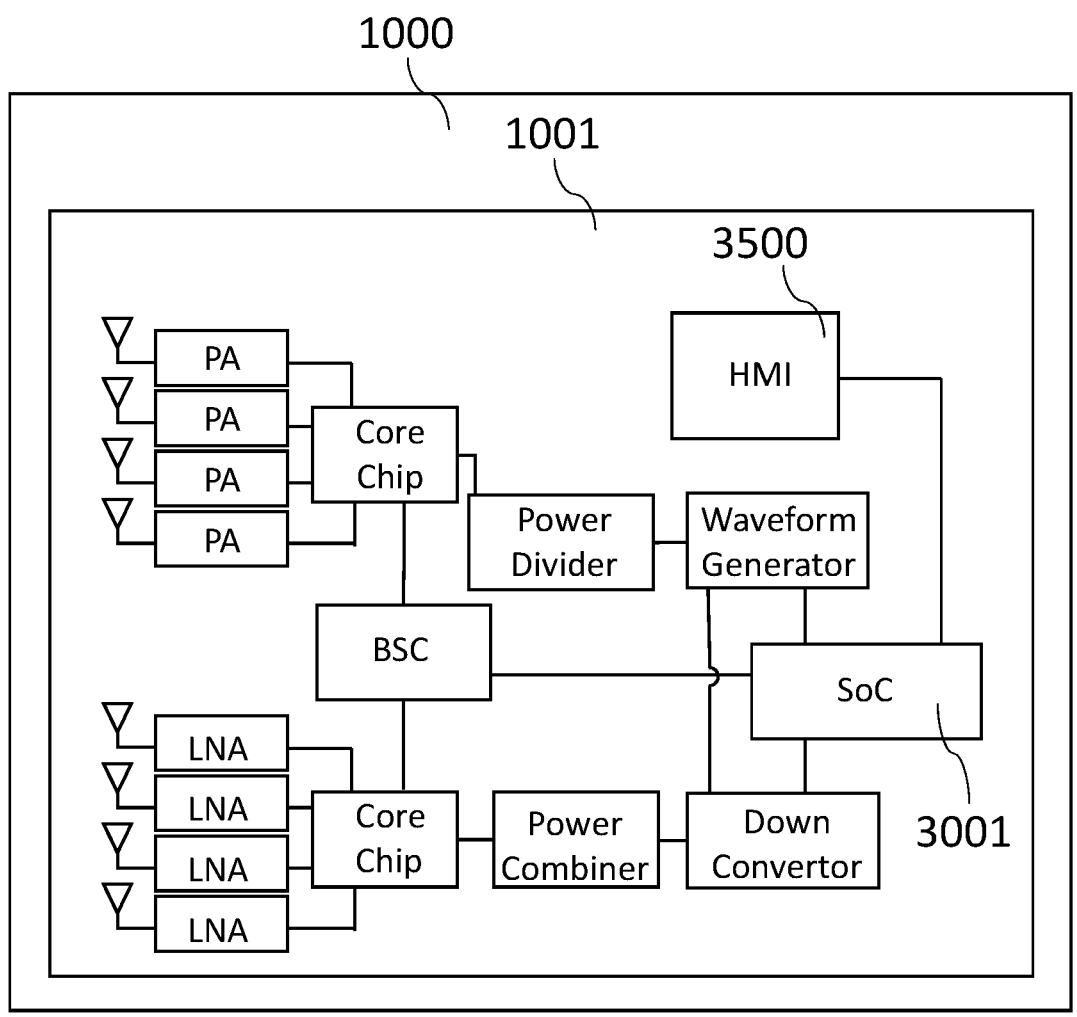
FIG. 4 is a block diagram of another embodiment of the hardware architecture of a radar system in accordance with of an embodiment the present disclosure.

Referring now to FIG. 4. According to an embodiment of the present disclosure, the HMI device 3500 and the computing system 3000 are integrated with the radar sensor system 2000 to form, a one-piece radar system 1000. For example, the human, machine interface 3500 may be accommodated in the housing of the radar sensor device. The computing system 3000 and the DSP 3500 may be integrated as a system on chip (SoC) device 3001 which comprise all of the necessary computing function to detect and/or track a target.

Figure 5:
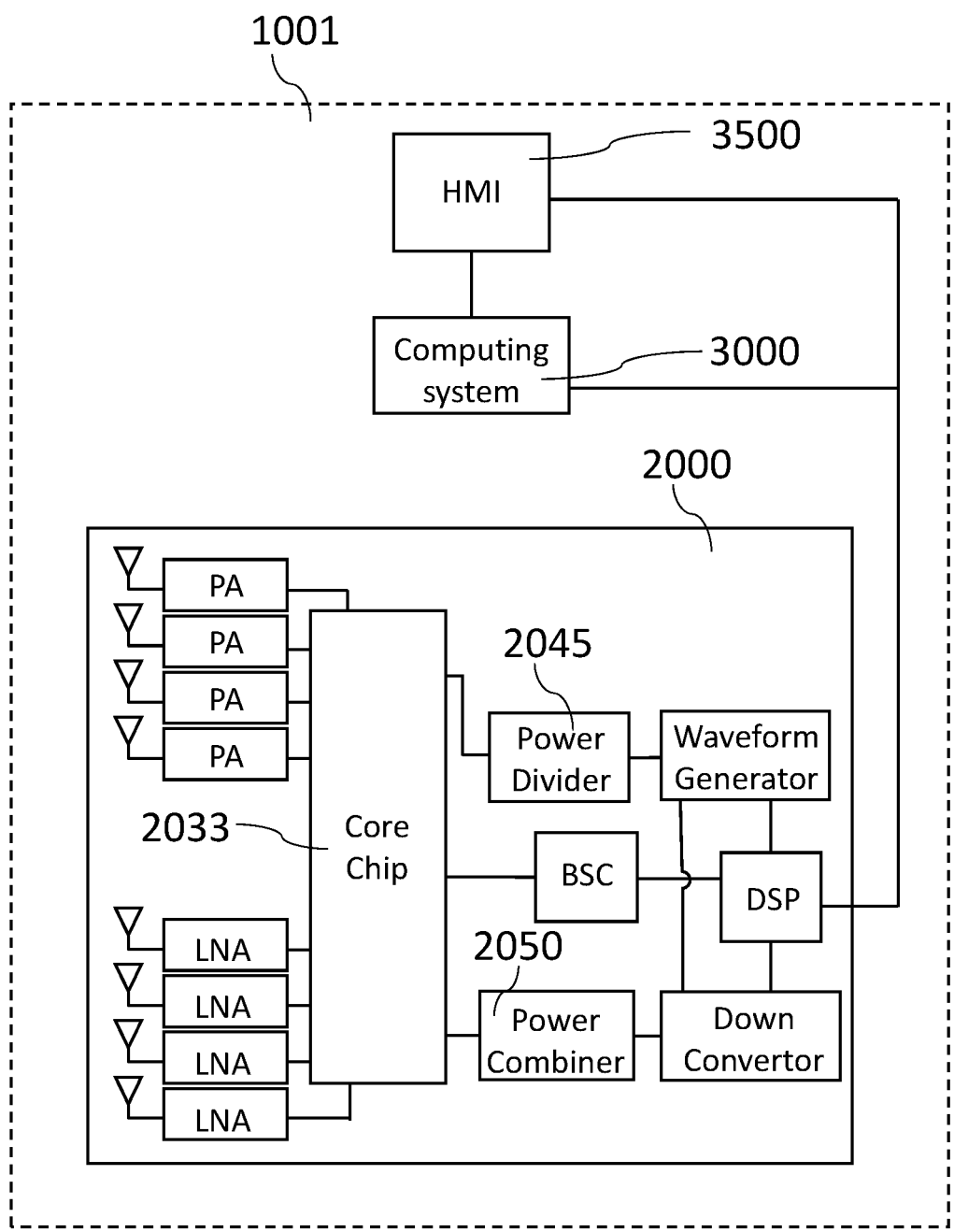
FIG. 5 is a block diagram of another embodiment of the hardware architecture of a radar system in accordance with of an embodiment the present disclosure.

Referring now to FIG. 5. According to an embodiment of the present disclosure, the radar sensor system 2000 may only comprise integrated core chip 2033. The integrated core chip 2033 comprise the function of both the transmitting core chip 2030 and the receiving core chip 2035. Additionally, the integrated core chip 2033 provides switchable bi-directional channels to all of the antenna of the radar sensor system 2000. As a result, in addition to a mode of transmitting and receiving simultaneously, the radar sensor system 2000 may have a full transmitting mode, a full receiving mode.

In the full transmitting mode, the integrated core chip 2033 outputs only signals inputted by the power divider 2045 to the antenna of the radar sensor system 2000 to the transmitting antenna 2030. In this case, it is possible to utilize all of the antenna of the radar sensor system 2000 as transmitting antenna 2010.

In the full receiving mode, the integrated core chip 2044 outputs only signals inputted by the low noise amplifier (LNA) 2025 to the power combiner. In this case, it is possible to utilize all of the antenna of the radar sensor system 2000 as receiving antenna 2015.

Figure 6:
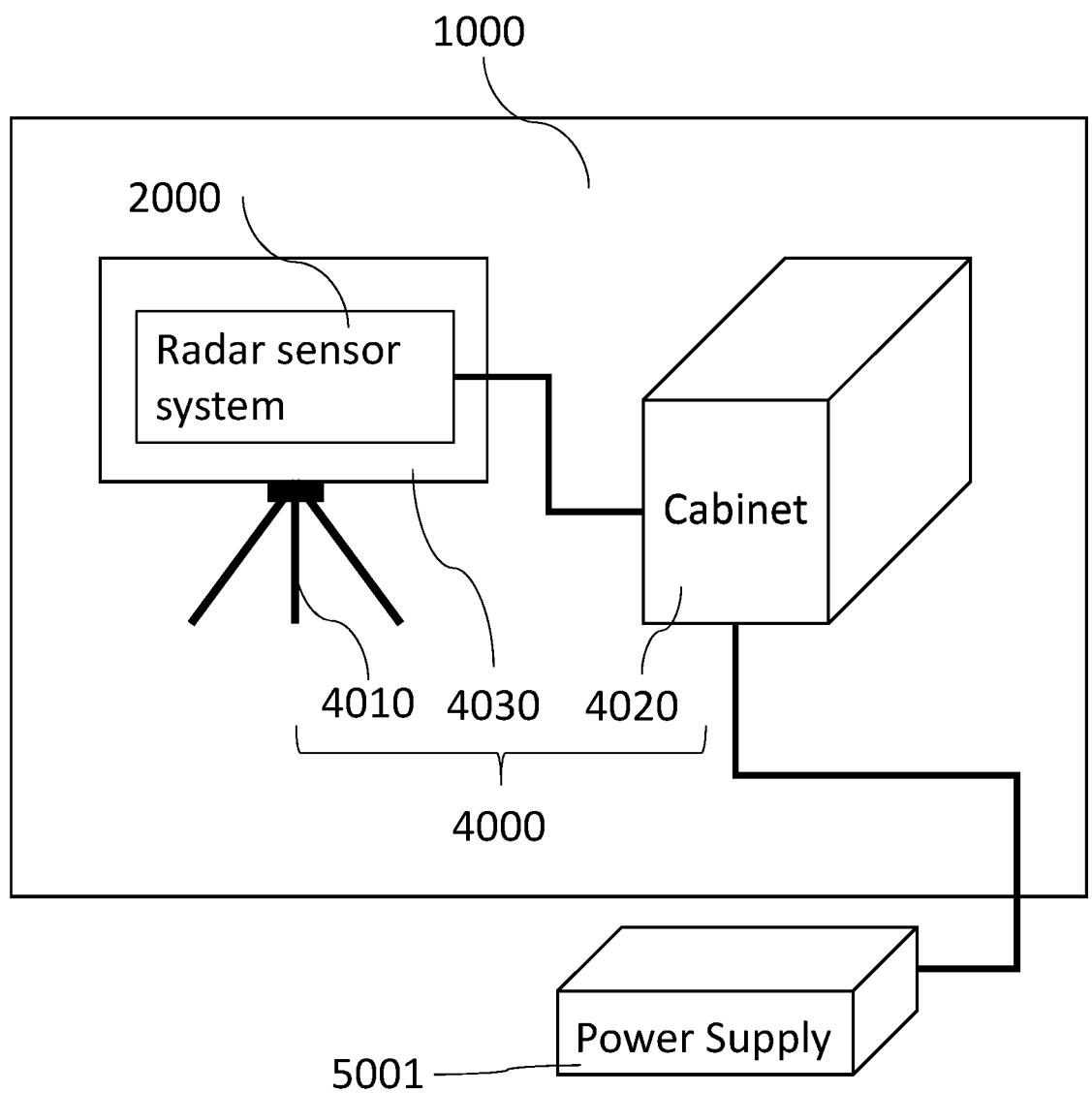
FIG. 6 is a schematic illustration of the hardware architecture of a radar system in accordance with of an embodiment the present disclosure.

Referring now to FIG. 6. According to an embodiment of the present disclosure, the plurality of mechanical structure 4000 may include a tripod 4010 for carrying the radar sensor system 2000, a cabinet 4020 for accommodating the computing system 3000 (not shown in FIG. 6), the at least one HMI device 3500 (not shown in FIG. 6) and others. The electronic power of the radar system 1000 is provided by an external power source 5001 electronically connected to a power supply module 3010 (not shown in FIG. 6) of the computing system 3000 (not shown in FIG. 6) accommodated by the cabinet 4020. The radar sensor system 2000 is electronically connected to the computing system 3000 (not shown in FIG. 6) accommodated by the cabinet 4020 to communicate electronic signal.

According to an embodiment of the present disclosure, the plurality of radar system instruction 1003 includes a beam scanning process 6000, a target detection process 7000, a target tracking process 8000 and an operation mode control process 9000.

According to an embodiment of the present disclosure, in the beam scanning process 6000, the RF EM waves emitted by the transmitting antenna module 2070 are manipulated to form at least one wave beam. And the transporting direction of the wave beam are controlled. For example, in the beam scanning process 6000, the BSC circuit receives beam scanning control signal from computing device 3050 through the DSP 2065, and generates phase control signal to control the transmitting core chip and the receiving core chip.

In some embodiments, the scan range may be set as the whole possible emitting range of the radar sensor system in order to search potential targets in the environment, in other embodiment, the scan range may be set as specific range of azimuth/altitude angle in order to detect specific target or direction of interest.

According to an embodiment of the present disclosure, the detection process 7000 is configured to analyze the signal received by the receiving antenna to identify a target and to obtain the range/velocity information of the target. The detection process 7000 includes steps of: (S001) receiving echo signals from the receiving circuit 2003 by the DSP 2065; (S002) analyzing the echo signal, by the DSP 2065 or both of the DSP 2065 and the computing device 3035, to extract features of at least one target; (S003) outputting target data which comprising the target features (range, direction, and/or velocity) based on the analysis of Step (S002), by the DSP 2065, the computing device, or both of the DSP 2065 aid the computing device 3035.

In Step (S001), the DSP 2065 receives echo signal from the receiving circuit 2003. In (Step S002), the DSP 2065 and the computing device 3035 executes a plurality of algorithms to analyze the echo signal. These algorithms may be executed by die DSP 2065 only, or by both of the DSP 2065 and the computing device 3035.

In Step (S002), the DSP 2065 outputs the result of signal processing to the computing system 3000. For example, the result of signal processing from the DSP 2065 may be inputted to a memory device 3030. The inputted data may be stored in memory spaces that are well defined to be corresponding to specific detection signal at specific coherent processing interval (CPI) of a specific scan direction during a scan period. For another example, the result of signal processing from the DSP 2065 may be inputted to the computing device for further signal processing steps. For another example, the result of signal processing from the DSP 2065 may be inputted to the HMI device 3500 to present to the user 0001 (not shown in the Figures) of the radar system 1000.

For example, in Step (S002), a range last Fourier transform (FFT) algorithm may be executed to identify a plurality range values that represent a distance of sources of echo signal.

For example, in Step (S002), a moving target identification (MTI) algorithm may be executed to identify the target with a time-variant position.

For example, in Step (S002), a non-coherent integration (NCI) algorithm may be executed to enhance the gain of the echo signal.

For example, in Step (S002), a Doppler FFT algorithm may be executed to obtain velocity information respecting to each range sampling of a single scan direction during a scan period. The result of Doppler FFT may combined with a result of range FFT to obtain an energy distribution map among the range and velocity. This energy distribution map is respecting to the received echo signal corresponding to a specific single scan direction during a scan period. By combing each of the energy distribution map of every single scan direction during a scan period, a map of energy distribution among range and velocity which is respecting to a scan frame is then obtained.

For example, in Step (S002), a FFT merge algorithm may be executed to determine a specific range value and a velocity value. The resulting range-velocity pair may be set as a target in the single scan direction during a scan period.

For example, in Step (S002), a clutter map algorithm may be executed to distinguish signals that represents clutter with signals that represents targets.

For example, in Step (S002), a cell constant false alarm rate (CFAR) algorithm may be executed to obtain an optimized threshold for noise filtering.

Some of these algorithms in Step (S002) are optional for analyzing of the echo signal, depends on the detection conditions or needs. For example, after the range FFT algorithm, the Doppler FFT and FFT merge may be executed to obtain the velocity information of targets. Alternatively, instead of the Doppler FFT and FFT merge, a NCI may be executed to obtain a gain of the echo signal, and only obtain the range information. In this case, the velocity may be obtained in the tracking process by the updating of the range information of targets.

Figure 7:
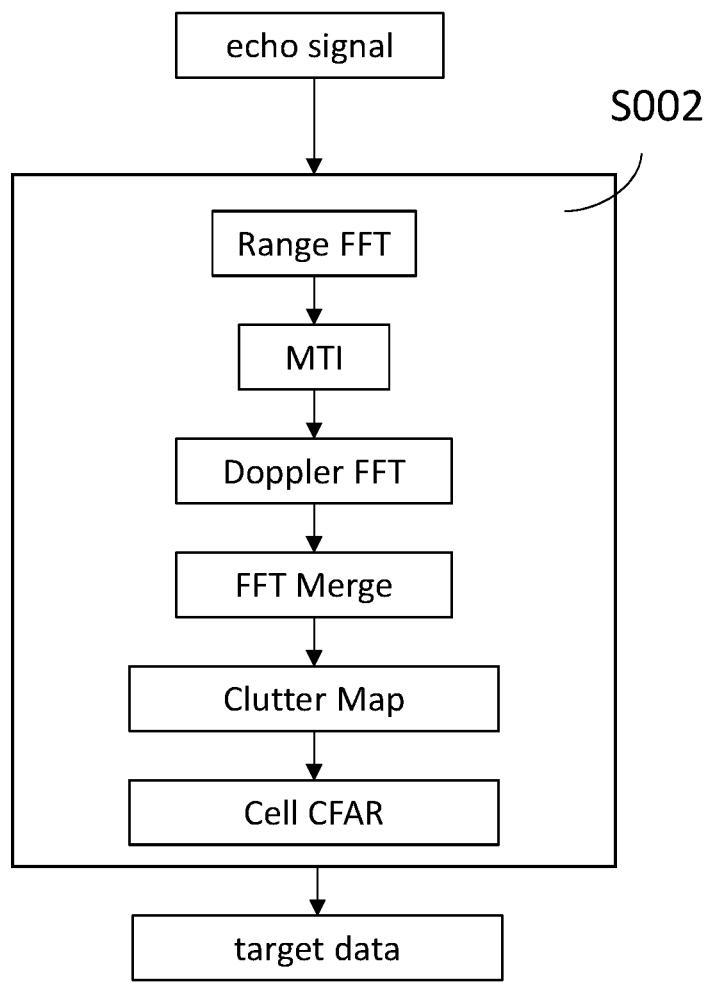
FIG. 7 is a flow diagram of a detection process in accordance with of an embodiment the present disclosure.

Referring now to FIG. 7. According to an embodiment of the present disclosure, an example of the Step (S002) includes sub-steps of executing the Range FFT, executing the MTI, executing the Doppler FFT, executing the FFT merge, and executing the clutter map, executing the Cell CFAR.

Figure 8:
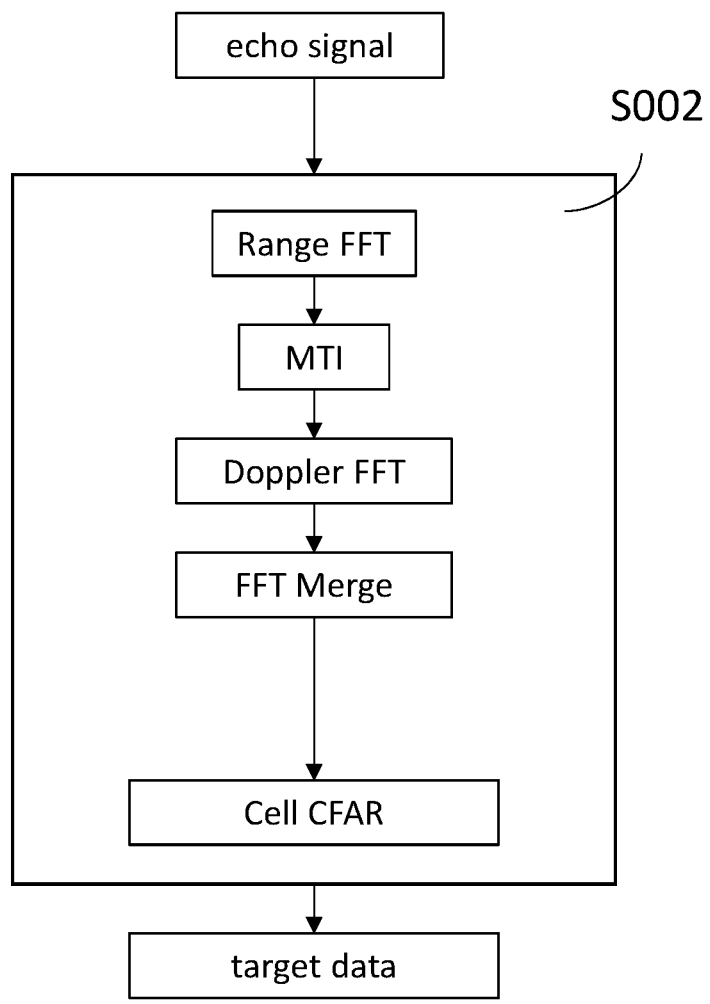
FIG. 8 is a flow diagram of a detection process in accordance with of another embodiment the present disclosure.

Referring now to FIG. 8. According to an embodiment of the present disclosure is depicted. In this embodiment, comparing to the embodiment depicted in FIG. 7, the clutter map algorithm is dismissed by a user 0001 of the radar system 1000 through the HMI device 3500.

Figure 9:
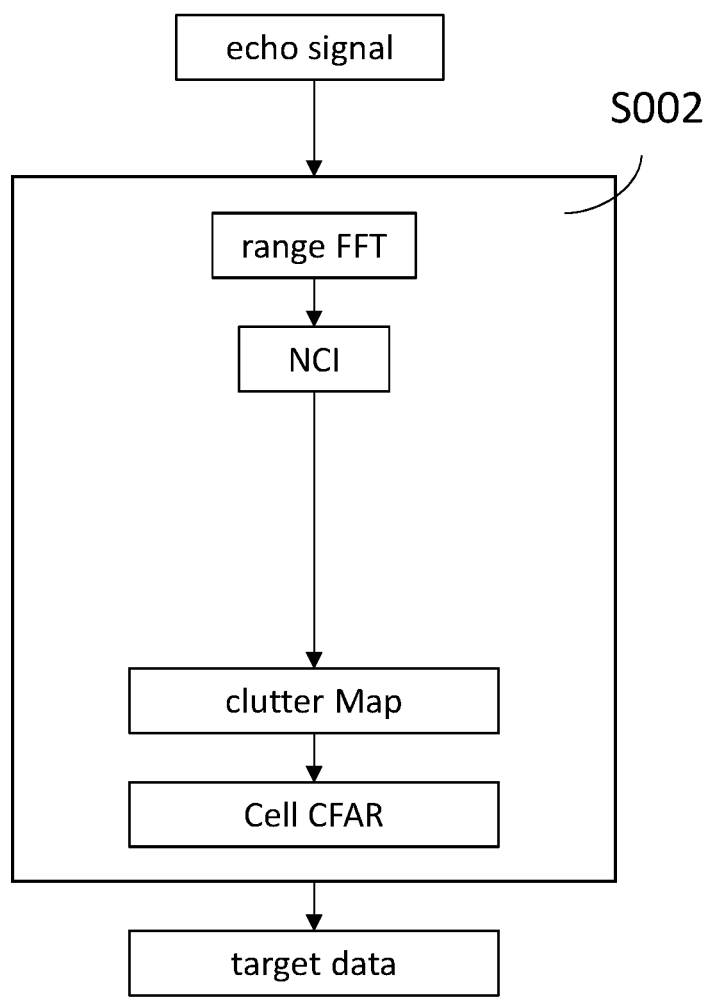
FIG. 9 is a flow diagram of a detection process in accordance with of another embodiment the present disclosure.

Referring now to FIG. 9. According to an embodiment of the present disclosure, the Step S002 include sub-steps of: executing the Range FFT, executing the NCI, executing the clutter map algorithm, and executing the cell CFAR.

Figure 10:
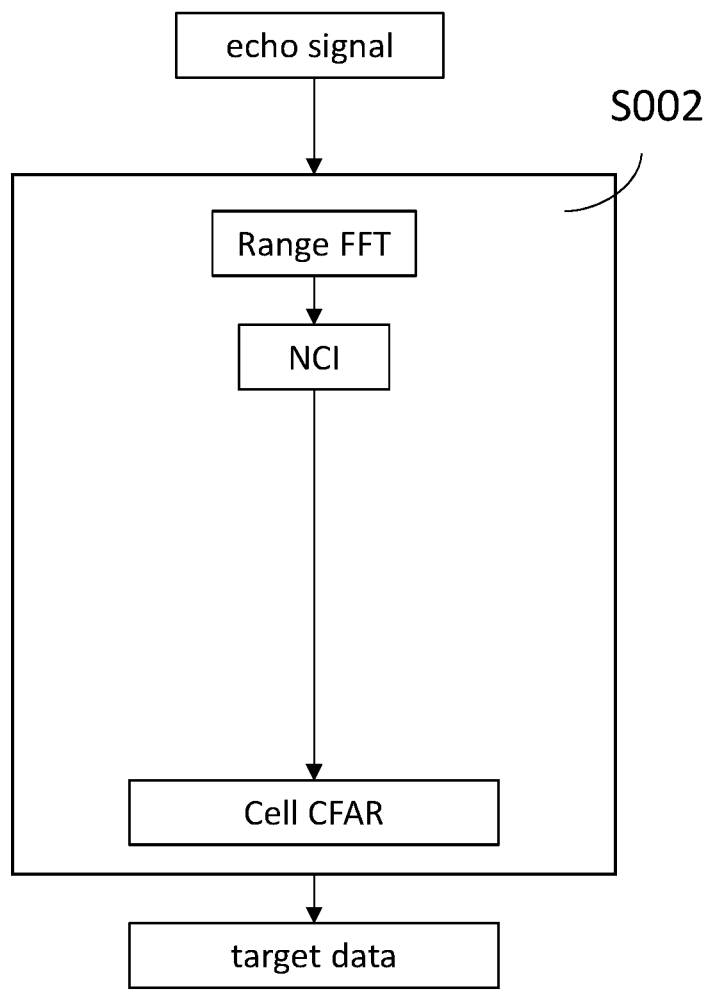
FIG. 10 is a flow diagram of a detection process in accordance with of another embodiment the present disclosure.

Referring now to FIG. 10. According to an embodiment of the present disclosure, the Step S002 include sub-steps of: executing the Range FFT, executing the NCI, and executing the cell CFAR.

In Step S006 of the embodiment, the computing device 3050 outputs the plurality of target characteristic determined in Step S005 to be stored in the memory device or to enter a display processing steps.

According to an embodiment of the present disclosure, the tracking process 8000 includes steps of: (S101) receiving, by the computing device, target data generated through a detection process 7000; (S102) correlating the received target data with previously detected target data; (S103) updating and outputting, by the computing device 3050, a target list; (S104) predicting, by the computing device 3050, a moving track of at least one interested target and outputting the prediction.

In Step (S102), if the target is identical to a previous target, updating the target features in the target list. Alternatively, if the target is not identical to a previous target, add a new target to the target list with the target features of the new target.

In Step (S104), the moving track of the target may be generated by an alpha-beta filter algorithm.

In some embodiment, the radar system 1000 operates in a tracking while scan (TWS) mode under which a TWS program is executed in the tracking process 8000. In this case, the beam is scanned (the emitting direction of beam is changed sequentially) within an angle range in order to search potential targets in the environment in the angle range. The radar system 1000 may generate and output target data of multiple detected targets of one scan period in the detection process 7000, and may hack at least one, or all of these detected targets by the tracking process 8000.

In an alternative embodiment, the radar system 1000 operates in a single target tracking (STT) mode under which a STT program is executed by the tracking process 8000. In this case, the beam is emitted toward at least one selected tracking target 7004 in order to track the motion of these predetermined targets. The radar system 1000 may generate and output target data of at least one selected tracking target 7004 of one scan period by the detection process 7000, and may execute a STT program to track at least one, or all of the multiple detected targets in the tracking process 8000.

According to an embodiment of die present disclosure. The radar system 1000 may executed a STT program comprises steps of: (S101) receiving, by the computing device 3050, target data generated through a detection process 7000; (S102) correlating, by the computing device 3050, the received target data with previously detected target data; (S103) updating and outputting by the computing device 3050, a target list; (S104) predicting, by the computing device 3050, a moving track of at least one interested target and outputting the prediction; (S105) controlling, by the computing device 3050, the radar sensor system 2000 to emit at least one STT detection wave beam toward a direction of the selected tracking target 7004; (S106) controlling, by the computing system, the radar sensor system

2000 to receive at least one echo waves corresponding to die at least one STT detection beam; and (S107) analyzing, by the DSP 2065, or the computing device 3050, or both of the DSP 2065 and the computing device 3050, echo signal corresponding to the STT detection wave beam direction received by the radar sensor system 2000 to generate a STT target data.

In Step (S105), the computing device 3050 controls the radar sensor system 2000 to emit detection wave beam toward specific directions through the beam scanning process 6000.

In Step (107), the radar system 1000 analyzes the echo signal through the detection process 7000.

In Step (S107) The STT target data comprises a list of detected objects detected by the at least one STT detection wave beam and comprises data of direction and distance of each of the detected objects in the STT target data.

Figure 11A:
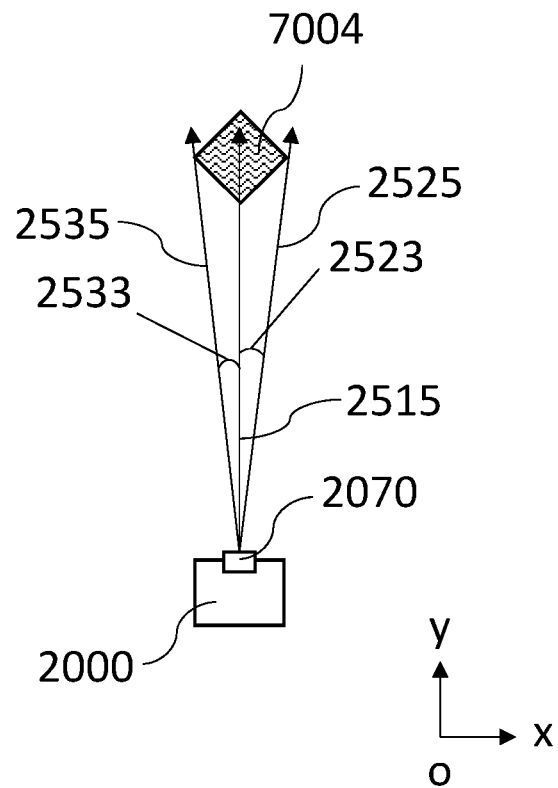
FIG. 11A is a schematic illustration of directions of detection beam in accordance with of an embodiment the present disclosure.
Figure 11B:
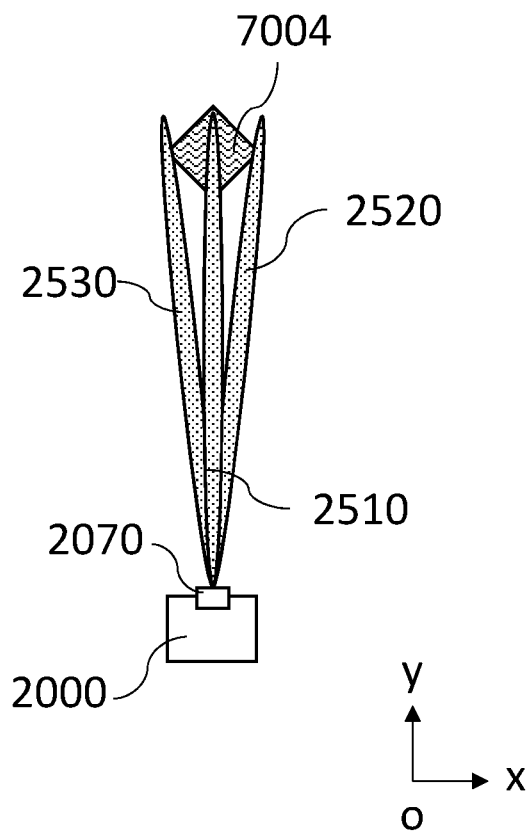
FIG. 11B is a schematic illustration of sequential lobes of detection beam in accordance with of an embodiment the present disclosure.

Referring now to FIG. 11A and FIG. 11B. According to an embodiment of present disclosure, the STT detection beam emitted by the transmitting antenna module 2070 of the radar sensor system 2000 under the SIT tracking mode includes three sequential lobes. The three sequential lobes include a middle lobe 2510 that is transmitted in a middle detection direction 2515, and other two lobes that are transmitted in directions 2025, 2035 deviating from each side of the middle detection direction on a same azimuth plane (the x-y plane in the FIG. 12A and FIG. 12B) for a first angle 2523 and a second angle 2533 respectively.

In some other embodiments, additionally, the STT program may further comprise an unlock algorithm. The unlock algorithm records the number of STT failure. A STT failure may occur when a detection beam does not hit the predetermined target, or when the correlation in (S102) suggest that there is no matched target, if the number of failure times exceeds a predetermined tracking failure threshold, the unlock algorithm may generate a command that stops the STT process for tracking the selected tracking target 7004. The predetermined tracking failure threshold may be set by the user 0001 through a HMI device 3500 of the radar system 1000.

Figure 12:
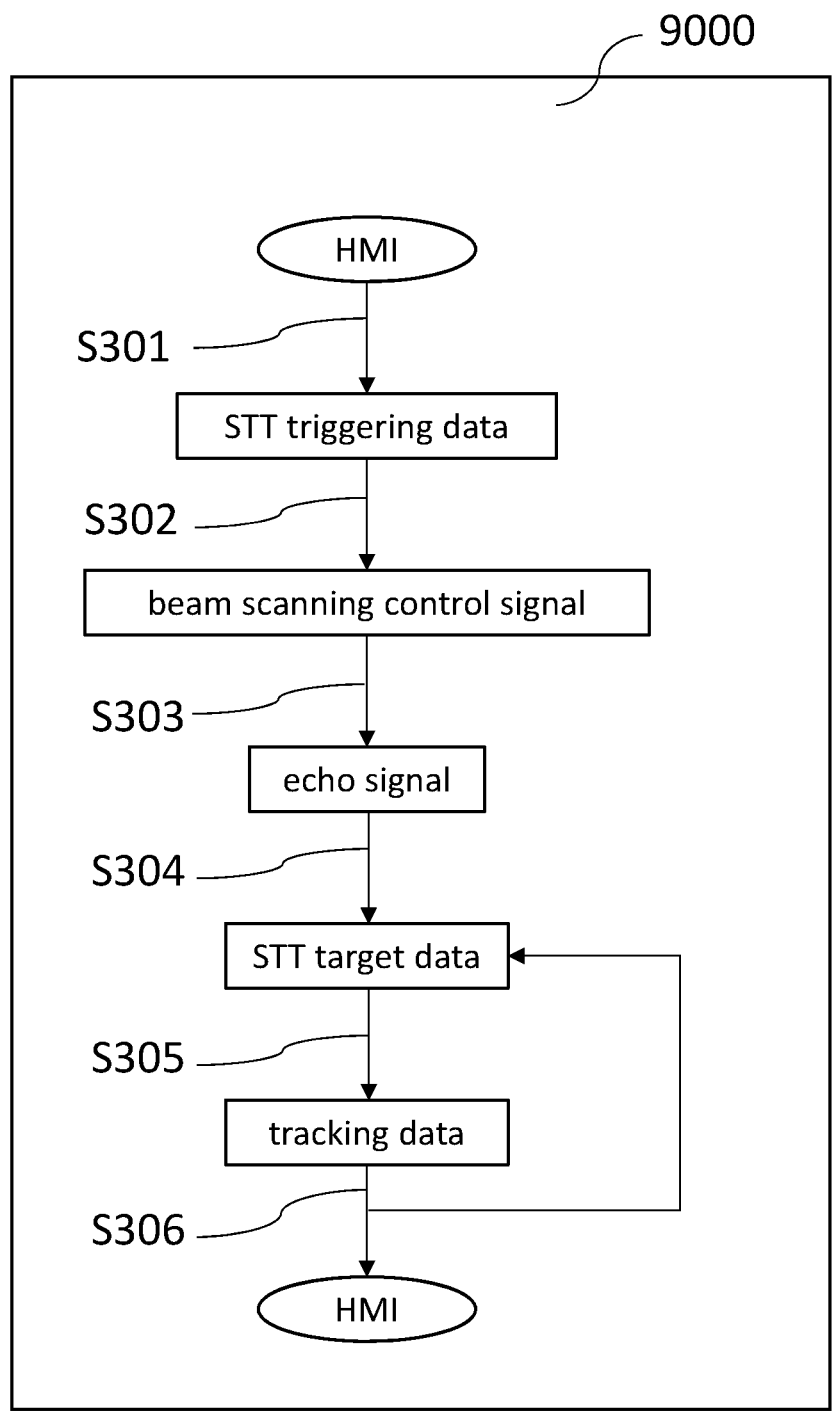
FIG. 12 is a flow diagram of an operation mode control method in accordance with of an embodiment the present disclosure.

Referring now to FIG. 12. According to an embodiment of the present disclosure; an operation mode control process 9000 implemented by the radar system 1000 for controlling the radar system 1000 includes steps of: (S301) receiving a single target tracking (STT) triggering data that represents triggering of a tracking mode from a HMI device 3500, the STT triggering data comprising representation of triggering of SIT tracking mode and a selected tracking target 7004 to be tracked by the radar system 1000; (S302) controlling a radar sensor system 2000 of the radar system 1000 to emit at least one first detection, wave beam 7003 toward the a first direction regarding to the selected tracking target 7004: (S303) controlling, by the computing system, the radar sensor to receive at least one first echo waves corresponding to the at least one first detection wave beam; (S304) analyzing, by the computing system, echo signal corresponding to the at least one first echo waves to generate a STT target data, wherein the STT target data comprises a list of detected objects detected by the at least one detection wave beam and comprises data of direction, distance and/or velocity of each of the detected objects in the STT target data; (S305) executing, by the computing system, the STT program to track the selected tracking target 7004; (S306) outputting, by the computing system, the tracking data of the selected target 7004 to the memory device for storage or to the HMI device 3500 for presenting to the user 0001.

In some embodiment of the Step (S301), the selected tracking target 7004 may be selected by the user 0001 of the radar system 1000 through a riser interface provided by the HMI device 3500. For example, the user interface may be an option list of multiple detected target, or may be a form of targets displayed on a plan position indicator (PPI) interface. In another example of the Step (S301), the selected tracking target 7004 may also be inputted from an autonomous target selecting program that is capable of selecting target from a TWS program to be tracked by STT program.

In Step (S304), the echo signal is analyzed by the detection process 7000.

Figure 13:
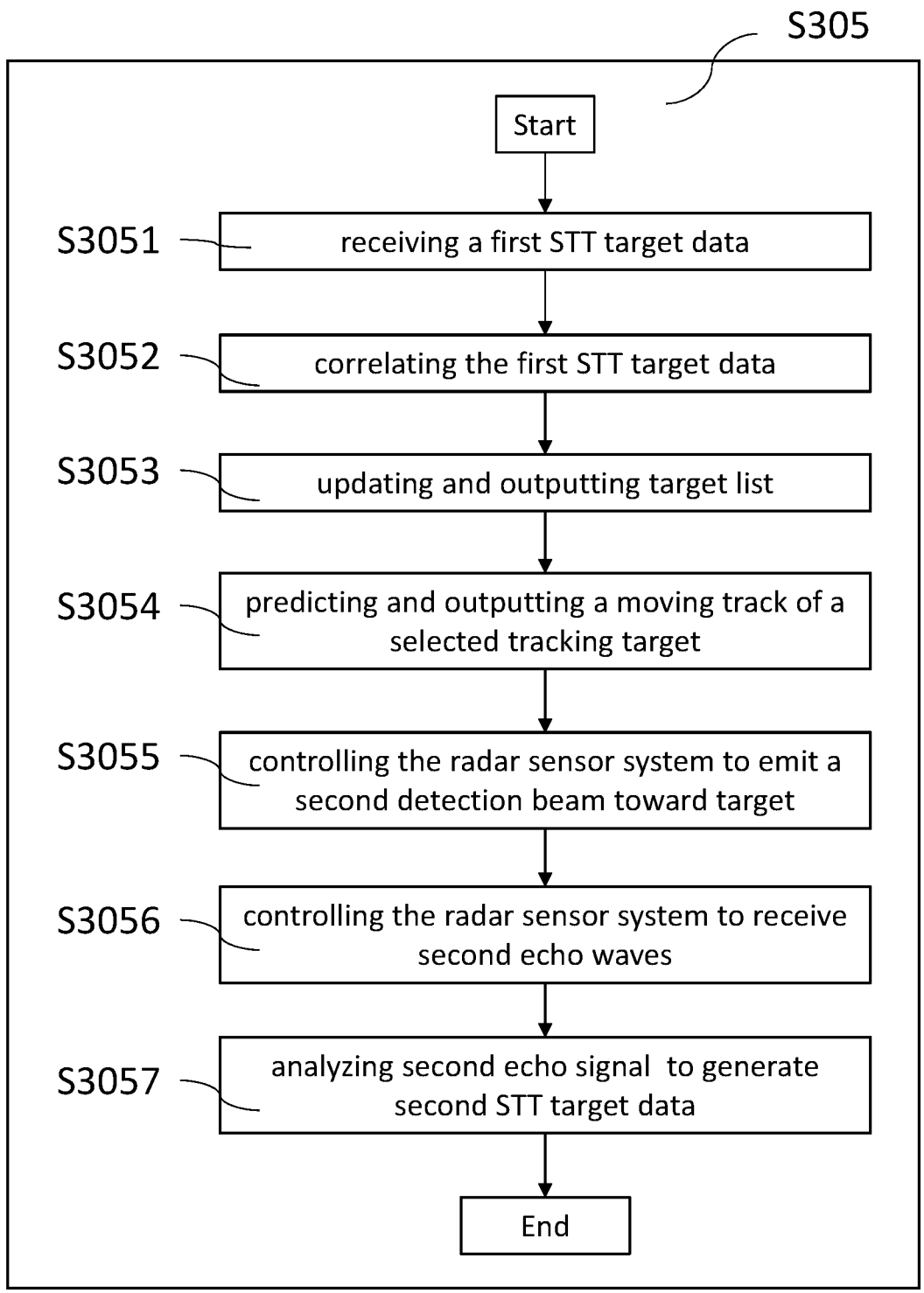
FIG. 13 is a flow diagram of a Single Target Tracking program in accordance with of an embodiment the present disclosure.

Referring now to FIG. 13. According to an embodiment of Step (S305) of the operation mode control process 9000, the STT program includes steps of: (S3051) receiving, by the computing device 3050 of the computing system 3000, the first STT target data; (S3052) correlating, by the computing device 3050 of the computing system 3000, the received first STT target data with a previous target data; (S3053) updating and outputting, by the computing device 3050 of the computing system 3000, a target list; (S3054) predicting a moving track of the selected tracking target 7004, and outputting, by the computing device 3050 of the computing system 3000, the predicted moving track of the selected tracking target 7004; (S3055) controlling, by the computing device 3050 of the computing system 3000, the radar sensor system 2000 to emit at least one second detection wave beam toward a second direction generated according to the predicted moving track of the selected tracking target 7004; (S3056) controlling, by the computing device 3050 of the computing system 3000, the radar sensor system 2000 to receive at least one second echo waves corresponding to the at least one second detection beam; and (S3057) analyzing, by the DSP 2065, the computing device 3050 of the computing system 3000, or both of the DSP 2065 and the computing device 3050 of the computing system 3000, second echo waves corresponding to the at least one second detection wave beam and received by the radar sensor system 2000 to generate a second STT target data, wherein the second STT target data comprises a list of second detected objects detected by the at least one second detection wave beam and comprises data of direction and distance of each of the second detected objects in the second STT target data.

In Step (S306), the tracking data (the range, direction, velocity, and/or the predicted moving track) may be displayed on the HMI device 3500. For example, the tracking data may be displayed on a PPI interface or a three-dimensional coordinate system that mimics the real environment.

According to an embodiment of the radar system 1000, the user 0001 of the radar system 1000 is capable of manipulating the beam scanning process 6000, the detection process 7000, and the tracking process 8000 of the radar system through the HMI device 3500.

For example, the HMI device 3500 may be configured to provide a beam scanning control user interface for the user 0001 to manipulate the beam scanning process 6000. The BSC user interface may include a beam pattern setting function for the user 0001 to set a beam pattern.

For example, the HMI device 3500 may be configured to provide a signal processing user interface for the user to manipulate the detection process 7000. The signal processing user interface may include a clutter map user interface to turn on off the clutter map algorithm and to set associative parameters, a Doppler FFT user interface to turn on/off the Doppler FFT algorithm and to set associative parameters, a MTI user interface to turn on/off the MTI algorithm and to set associative parameters, a CFAR user interface to turn on/off the CFAR algorithm and to set associative parameters (such as a V gain threshold and/or a R gain threshold).

For example, the HMI device 3500 may be configured to provide a tracking process user interface for the user 0001 to manipulate the tracking process 8000. The tracking process user interface may include a STT triggering command for the user 0001 to initiate the operation mode control process 9000. The tracking process user interface may further include an alpha-beta filter setting function for a user 0001 to setting the parameter of the alpha-beta filter algorithm.

According to an embodiment of the radar system 1000, the radar system 1000 may be operated originally in a TWS tracking mode prior to a triggering of STT mode by the operation mode control process 9000.

According to an embodiment of the radar system 1000, the radar system 1000 is alternatingly switched between the TWS tracking mode and the STT tracking mode when a time criterion is met. For example, the time criterion may be set as to operate under the SIT tracking mode for a predetermined STT period, and to operate under the TWS tracking mode for a predetermined TWS tracking period. The time criterion may be set by the user 0001 through the HMI device 3500.

In sum, according to the various embodiments of the present disclosure, the radar system utilizes the operation mode control method to allow a user of the radar system to switch the operation of the radar system 1000 between the STT tracking mode and the TWS tracking mode. Further, the radar system 1000 provides user interface for a user to trigger a tracking mode switching; and/or for the user to set the parameters of signal processing and analysis of the operation mode control method.

What is claimed is:

1. An operation mode control method implemented by a radar system, the operation mode control method comprising steps of:
   receiving, by a computing system of the radar system, a single target tracking (STT) triggering data comprising:
   a representation of triggering of a STT tracking mode; and
   a selected tracking target to be tracked by the radar system;
   controlling, by the computing system, a radar sensor system electrically connected to the computer system to emit at least one first detection wave beam toward a first direction generated according to the selected tracking target;
   controlling, by the computing system, the radar sensor system to receive at least one first echo waves corresponding to the at least one first detection wave beam;
   analyzing, by a digital signal processor (DSP) of the radar sensor system, the computing system, or both of the DSP and the computing system, a first echo signal to generate a first STT target data, wherein the first STT target data comprises a list of first detected objects detected by the at least one first detection wave beam and comprises data of direction and distance of each of the first detected objects in the STT target data, wherein analyzing the first echo signal includes executing a Doppler Fast Fourier Transform (FFT) algorithm and a FFT merge algorithm or a non-coherent integration (NCI);
   executing a range FFT algorithm;
   after executing the range FFT, executing a moving target identification (MTI) algorithm, wherein the Doppler FFT algorithm is executed after the MTI algorithm;
   executing, by the computing system, a STT program to track the selected tracking target to obtain a tracking data of the selected tracking target, wherein the tracking data comprises range, direction, and velocity of the selected tracking target; and
   outputting, by the computing system, the tracking data of the selected tracking target to a memory device for storage or to a human-machine interface (HMI) device electrically connected to the computing system and the DSP for presenting to the user of the radar system.

2. The operation mode control method according to the claim 1, further comprising a step of: displaying, by the HMI device, a STT triggering function to allow the user to trigger the HMI device to generate the representation of triggering of the STT tracking mode.

3. The operation mode control method according to the claim 1, further comprising a step of: displaying, by the HMI device, a target selecting option to allow the user to select the tracking target under the STT tracking mode.

4. The operation mode control method according to the claim 3, wherein the target selecting option is displayed in a form of text list.

5. The operation mode control method according to the claim 3, wherein the target selecting option is displayed in a form of icons on a plan position indicator (PPI).

6. The operation mode control method according to the claim 1, further comprising a step of: displaying, by the HMI device, a STT control item, wherein the STT control item allows the user to set a threshold number of STT failure, wherein the STT failure is used as a criterion for stopping the single target tracking of the selected tracking target.

7. The operation mode control method according to the claim 1, wherein the selected tracking target is selected from a target list generated by a tracking while scan (TWS) program, and is selected by the computing system.

8. The operation mode control method according to the claim 1, wherein the at least one first detection wave beam comprises three sequential lobes, a middle lobe of the sequential lobes is transmitted in the first detection direction, and the other two lobes of the sequential lobes are on directions deviating from each side of the first detection direction on a same azimuth plane for a first angle and a second angle, respectively.

9. The operation mode control method according to the claim 1, wherein the STT program comprises steps of:
   (S51) receiving, by the computing system, the first STT target data;
   (S52) correlating, by the computing system, the received first STT target data with a previous target data;
   (S53) updating and outputting, by the computing system, a target list;
   (S54) predicting a moving track of the selected tracking target, and outputting, by the computing system, a predicted moving track of the selected tracking target;
   (S55) controlling, by the computing system, the radar sensor system to emit at least one second detection wave beam toward a second direction generated according to the predicted moving track of the selected tracking target;
   (S56) controlling, by the computing system, the radar sensor system to receive at least one second echo waves corresponding to the at least one second detection beam; and (S57) analyzing, by the DSP, the computing system, or both of the DSP and the computing system, a second echo signal corresponding to the at least one second detection wave beam and received by the radar sensor system to generate a second STT target data, wherein the second STT target data comprises a list of second detected objects detected by the at least one second detection wave beam and comprises data of direction and distance of each of the second detected objects in the second STT target data.

10. The operation mode control method according to the claim 9, wherein the moving track of the selected tracking target is predicted according to an alpha-beta filter algorithm.

11. The operation mode control method according to the claim 10, further comprising a step of: displaying, by the HMI device, a STT control item, wherein the STT control item provides options for the user to set parameters of the alpha-beta filter algorithm.

12. The operation mode control method according to the claim 1, wherein the at least one first detection wave beam is emitted by a transmitting phased array antenna module of the radar sensor system, and the first echo waves is received by a receiving phased array antenna module of the radar sensor system.

13. The operation mode control method according to the claim 1, wherein the radar system is operated under a tracking while scan (TWS) tracking mode prior to receiving the STT triggering data.

14. A radar system comprising:
a human machine interface (HMI) device; and
a computing system electrically connected to the HMI device, wherein the computing system comprises a memory device and is configured to execute steps of:
receiving, by the computing system of the radar system, a single target tracking (STT) triggering data comprising:
a representation of triggering of a STT tracking mode; and
a selected tracking target to be tracked by the radar system;
controlling, by the computing system, a radar sensor system electrically connected to the computer system to emit at least one first detection wave beam toward a first direction generated according to the selected tracking target, wherein the at least one first detection wave beam comprises three sequential lobes, a middle lobe of the sequential lobes is transmitted in the first detection direction toward the selected tracking target, and the other two lobes of the sequential lobes are on directions deviating from each side of the first detection direction on a same azimuth plane for a first angle and a second angle, respectively, and are transmitted in the directions toward the selected tracking target;
controlling, by the computing system, the radar sensor to receive at least one first echo waves corresponding to the at least one first detection wave beam;
analyzing, by a digital signal processor (DSP) of the radar sensor system, the computing system, or both of the DSP and the computing system, first echo waves to generate a first STT target data, wherein the first STT target data comprises a list of first detected objects detected by the at least one first detection wave beam and comprises data of direction and distance of each of the first detected objects in the STT target data, wherein analyzing the first echo signal includes executing a Doppler Fast Fourier Transform (FFT) algorithm and a FFT merge algorithm or a non-coherent integration (NCI);
executing a range FFT algorithm;
after executing the range FFT, executing a moving target identification (MTI) algorithm, wherein the NCI algorithm is executed after the MTI algorithm;
executing, by the computing system, a STT program to track the selected tracking target to obtain a tracking data of the selected tracking target, wherein the tracking data comprises range, direction, and velocity of the selected tracking target; and
outputting, by the computing system, the tracking data of the selected tracking target to the memory device for storage or to the human-machine interface (HMI) device electrically connected to the computing system and the DSP for presenting to the user of the radar system.

15. The radar system according to the claim 14, wherein the HMI device is further configured to display a STT triggering function to allow the user to trigger the HMI device to generate the representation of triggering of the STT tracking mode.

16. The radar system according to the claim 14, wherein the HMI device is further configured to display a target selecting option on the HMI device to let the user to select a target to be tracked by the STT tracking mode.

17. The radar system according to the claim 16, wherein the target selecting option is displayed in a form of text list.

18. The radar system according to the claim 16, wherein the target selecting option is displayed in a form of icons on a plan position indicator (PPI).

19. The radar system according to the claim 14, wherein the HMI device is configured to display a STT control item on the HMI device, wherein the STT control item allows the user to set a threshold number of STT failure, wherein the STT failure is used as a criterion for stopping the single target tracking of the selected tracking target.

20. The radar system according to the claim 14, wherein the computing system is further configured to select the selected tracking target from a target list generated by a Tracking While Scan (TWS) program, and is selected by the computing system.

21. The radar system according to the claim 14, wherein the STT program comprises steps of: (S51) receiving, by the computing system, the first STT target data;
(S52) correlating, the computing system, the received first STT target data with a previous target data;
(S53) updating and outputting, by the computing system, a target list;
(S54) predicting a moving track of the selected tracking target, and outputting, by the computing system, the predicted moving track of the selected tracking target;
(S55) controlling, by the computing system, the radar sensor system to emit at least one second detection wave beam toward a second direction generated according to the predicted moving track of the selected tracking target;
(S56) controlling, by the computing system, the radar sensor system to receive at least one second echo waves corresponding to the at least one second detection beam; and
(S57) analyzing, by the DSP, the computing system, or both of the DSP and the computing system, second echo waves corresponding to the at least one second detection wave beam and received by the radar sensor system to generate a second STT target data, wherein the second STT target data comprises a list of second detected objects detected by the at least one second detection wave beam and comprises data of direction and distance of each of the second detected objects in the second STT target data.

22. The radar system according to the claim 21, wherein the moving track of the selected tracking target is predicted according to an alpha-beta filter algorithm.

23. The radar system according to the claim 22, wherein the HMI device is further configured to display a STT control item allowing the user to manipulate the step of (S4), wherein the STT control item provides options for the user to set parameters of the alpha-beta filter algorithm.

24. The radar system according to the claim 14, further comprising a transmitting phased array antenna module configured to emit the at least one first detection wave beam and a receiving phased array antenna to receive the at least one echo wave.

25. The radar system according to the claim 14, being further configured to be operated under a tracking while scan (TWS) tracking mode prior to receiving the STT triggering data.

26. The radar system according to the claim 14, being alternatingly switched between a tracking while scan (TWS) program and the STT tracking mode when a time criterion is met.

27. The radar system according to the claim 14, wherein the DSP and the computer system are communicated through a wireless type communication machine-machine interface.

28. The radar system according to the claim 14, wherein the DSP and the computer system are integrated by a system on chip (SoC) device, the SoC device is integrated with the radar sensor system, and the radar sensor system is electrically connected to the HMI device.

29. The radar system according to the claim 14, wherein the three lobes are transmitted in the directions toward the selected tracking target simultaneously.

30. A radar system comprising:
a transmitting circuit;
a receiving circuit;
a processor coupled to the transmitting circuit and the receiving circuit; and
a memory coupled to the processor and storing instructions, wherein the processor is configured to execute the instructions to:
control the transmitting circuit to emit a detection wave beam to a target;
control the receiving circuit to receive an echo wave that corresponds to the detection wave beam;
analyze the echo wave received by the receiving circuit to generate data of the target, wherein analyzing the echo wave includes executing a Doppler Fast Fourier Transform (FFT) algorithm and a FFT merge algorithm or a non-coherent integration (NCI);
executing a range FFT algorithm;
after executing the range FFT, executing a moving target identification (MTI) algorithm, wherein the Doppler FFT algorithm or the non-coherent integration (NCI) is executed after the MTI algorithm; and
output the data.

* * * * *